United States Patent
Cao et al.

(10) Patent No.: US 9,483,818 B2
(45) Date of Patent: Nov. 1, 2016

(54) BLEED-THROUGH DETECTION METHOD AND BLEED-THROUGH DETECTION APPARATUS

(71) Applicant: FUJITSU LIMITED, Kawasaki-shi, Kanagawa (JP)

(72) Inventors: Qiong Cao, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/584,153

(22) Filed: Dec. 29, 2014

(65) Prior Publication Data

US 2015/0187075 A1     Jul. 2, 2015

(30) Foreign Application Priority Data

Dec. 30, 2013   (CN) .......................... 2013 1 0744057

(51) Int. Cl.
G06T 7/00     (2006.01)

(52) U.S. Cl.
CPC ... G06T 7/0002 (2013.01); *G06T 2207/30168* (2013.01); *G06T 2207/30176* (2013.01)

(58) Field of Classification Search
None
See application file for complete search history.

(56) References Cited

U.S. PATENT DOCUMENTS

2004/0008884 A1* 1/2004 Simske ............... H04N 1/4095
                                                                                    382/165
2006/0215231 A1* 9/2006 Borrey ................. G06K 9/3208
                                                                                    358/448

OTHER PUBLICATIONS

Wang et al. "Accurate Alignment of Double-sided Manuscripts for Bleed-through Removal." The Eighth IAPR International Workshop on Document Analysis Systems, Sep. 16, 2008, pp. 69-75.*
Chi et al. "Reduction of Bleed-through Effect in Images of Chinese Bank Items." International Conference on Frontiers in Handwriting Recognition, Sep. 18, 2012, pp. 174-178.*
Nishida et al. "A Multiscale Approach to Restoring Scanned Color Document Images with Show-Through Effects." Seventh International Conference on Document Analysis and Recognition, vol. 1, Aug. 3, 2003, pp. 584-588.*

* cited by examiner

*Primary Examiner* — Jon Chang
(74) *Attorney, Agent, or Firm* — Staas & Halsey LLP

(57) ABSTRACT

The present invention discloses a bleed-through detection method and a bleed-through detection device. The method includes: obtaining a recto image and a verso image, thereby obtaining pixel pairs including the first points and the corresponding second points; determining some foreground pixels and some background pixels; performing modeling for four types of pixel pairs, so as to form four models; calculating, for a pixel pair that hasn't been modeled, similarities of the pixel pair with respect to the four models respectively, so as to determine a type of the pixel pair; and judging, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel.

20 Claims, 5 Drawing Sheets

BLEED-THROUGH DETECTION METHOD AND BLEED-THROUGH DETECTION APPARATUS

CROSS REFERENCE TO RELATED APPLICATIONS

This application claims priority to Chinese Patent Application No. 201310744057.8, filed on Dec. 30, 2013 and entitled "Bleed-through Detection Method and Bleed-through Detection Apparatus", contents of which are incorporated herein by reference in its entirety.

FIELD OF THE INVENTION

The present invention generally relates to the field of image processing and in particular to a method of and apparatus for detecting the location of a bleed-through pixel in a double-sided image pair including a recto image and a verso image.

BACKGROUND OF THE INVENTION

In a double-sided document with a recto and a verso, there is a bleed-through phenomenon of the document so that a part or all of a text on either of the sides may be visible from the other side. This bleed-through phenomenon may impair the readability of the document and automatic character recognition on the document. Consequently, bleed-through pixels in the document have to be processed to improve the readability of the document or the accuracy of automatic character recognition on the document.

The bleed-through pixels can be processed only if accurate locations of the bleed-through pixels are detected, that is, those bleed-through pixels are judged from the pixels in the document images.

Generally, in a conventional solution, an appropriate threshold is selected, and the pixel value of a pixel is compared with the threshold to differentiate bleed-through from a text. Apparently, this solution is rather coarse because there is a low difference between a foreground pixel represented by the text and a bleed-through pixel in the case of serious bleed-through whereas there is an insignificant difference between a background pixel and a bleed-through pixel in the case of slight bleed-through. Consequently, there is a poor effect of processing in the conventional solution.

There is a need of a bleed-through detection method of and bleed-through detection apparatus for detecting accurately the location of a bleed-through pixel in a double-sided image pair including a recto image and a verso image.

SUMMARY OF THE INVENTION

The following presents a simplified summary of the invention in order to provide basic understanding of some aspects of the invention. It shall be appreciated that this summary is not an exhaustive overview of the invention. It is not intended to identify key or critical elements of the invention or to delineate the scope of the invention. Its sole purpose is to present some concepts in a simplified form as a prelude to the more detailed description that is discussed later.

In view of the above problems in the prior art, an object of the invention is to provide a bleed-through detection method of and bleed-through detection apparatus for detecting accurately the location of a bleed-through pixel.

In order to attain the above object, according to an aspect of the invention, there is provided a method for bleed-through detection, the method including: obtaining a recto image and a verso image in a double-sided image pair which have been aligned, wherein for each first point in the recto image, a second point corresponding thereto in the verso image is known, thereby obtaining pixel pairs including the first points and the corresponding second points; determining some foreground pixels and some background pixels in the recto image and the verso image; performing modeling for the following four types of pixel pairs based on a predetermined feature, on the basis of a result of the determining, so as to form four models: both a first point and a second point are foreground pixels, both a first point and a second point are background pixels, a first point is a foreground pixel and a second point is a background pixel, and a first point is a background pixel and a second point is a foreground pixel; calculating, for a pixel pair that hasn't been modeled, similarities of the pixel pair with respect to the four models respectively, according to the predetermined feature of the pixel pair, so as to determine a type of the pixel pair; and judging, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel.

According to another aspect of the invention, there is provided an apparatus for bleed-through detection, the apparatus including: an obtaining device configured to: acquire a recto image and a verso image in a double-sided image pair which have been aligned, wherein for each first point in the recto image, a second point corresponding thereto in the verso image is known, thereby obtaining pixel pairs including the first points and the corresponding second points; a some-pixels determining device configured to: determine some foreground pixels and some background pixels in the recto image and the verso image; a modeling device configured to: perform modeling for the following four types of pixel pairs based on a predetermined feature, on the basis of a result of the determining by the some pixels determining device, so as to form four models: both first point and second point are foreground pixels, both first point and second point are background pixels, a first point is a foreground pixel and a second point is a background pixel, and a first point is a background pixel and a second point is a foreground pixel; a type determining device configured to: calculate, for a pixel pair that hasn't been modeled, similarities of the pixel pair with respect to the four models respectively, according to the predetermined feature of the pixel pair, so as to determine a type of the pixel pair; and a judging device configured to: determine, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel.

Furthermore, according to still another aspect of the invention, there is further provided a storage medium including machine readable program codes, which upon execution on an information processing device cause the information processing device to perform the above method according to the invention.

Moreover, according to a further aspect of the invention, there is further provided a program product including machine executable instructions, which upon execution on an information processing device cause the information processing device to perform the above method according to the invention.

BRIEF DESCRIPTION OF THE DRAWINGS

The foregoing and other objects, features and advantages of the invention will be more readily understood from the following description of embodiments of the invention with reference to the drawings. Components in the drawings are merely intended to illustrate the principle of the invention. In the drawings, identical or similar technical features or components will be denoted by identical or similar reference numerals. In the drawings.

DETAILED DESCRIPTION OF THE INVENTION

Figure 1:
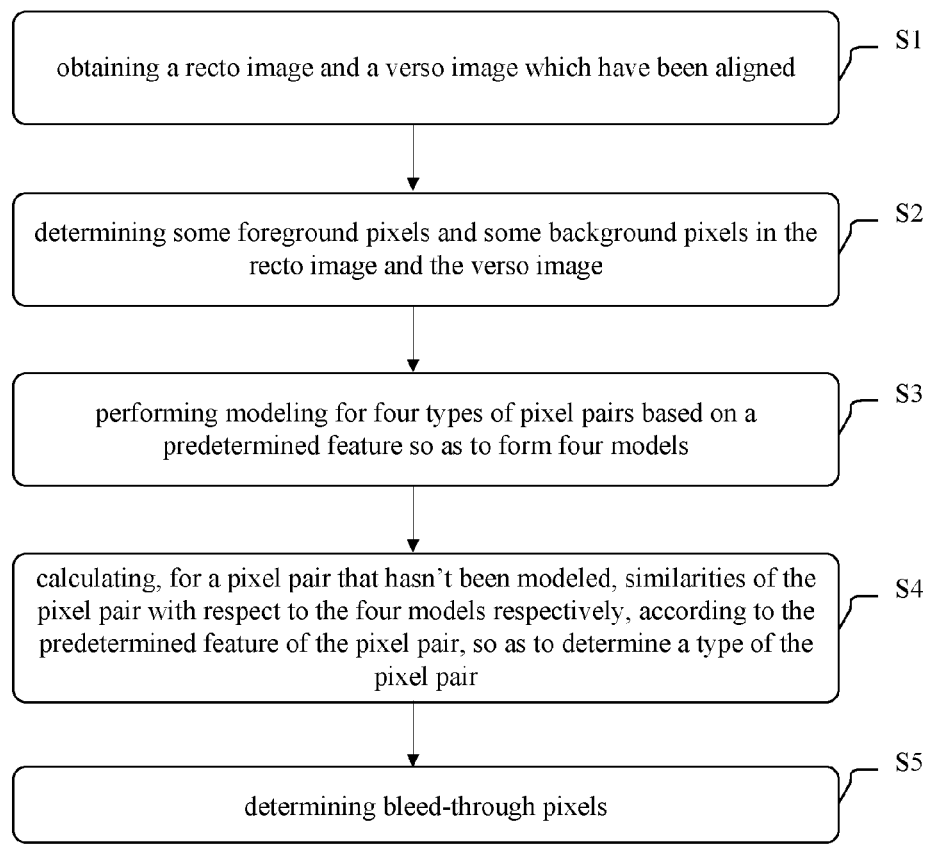
FIG. 1 illustrates a flow chart of a method of bleed-through detection according to a first embodiment of the invention.

Exemplary embodiments of the present invention will be described below in conjunction with the accompanying drawings. For the sake of clarity and conciseness, not all the features of practical implementations have been described in the specification. However, it is to be appreciated that numerous implementation-specific decisions shall be made during developing any of such practical implementations so as to achieve the developer's specific goals, for example, to comply with those system- and business-related constraining conditions which may vary from one implementation to another. Moreover, it shall also be appreciated that such a development effort might be very complex and time-consuming but may simply be a routine task for those skilled in the art benefiting from this disclosure.

It shall further be noted here that only those apparatus structures and/or process steps closely relevant to the solutions of the invention will be illustrated in the drawings while other details less relevant to the invention are omitted so as not to obscure the invention due to those unnecessary details. Moreover, it shall be further noted that an element and a feature described in a drawing or an implementation of the invention can be combined with an element or elements and a feature or features illustrated in one or more other drawings or implementations.

A general idea of the invention lies in that firstly those definitely correct foreground pixels and background pixels are determined, and then models are built using these foreground pixels and background pixels and types of the other pixels are judged using the built models. In this process, the characteristic of a bleed-through pixel are taken into account and objects to be processed can be picked out to thereby lower the amount of calculations and speed up the process.

A flow of a method of bleed-through detection according to a first embodiment of the invention will be described below with reference to FIG. 1.

FIG. 1 illustrates a flow chart of a method of bleed-through detection according to a first embodiment of the invention. As illustrated in FIG. 1, the method of bleed-through detection according to the first embodiment of the invention includes the following steps of: obtaining a recto image and a verso image which have been aligned, where for each first point in the recto image, a second point corresponding thereto in the verso image is known, thereby obtaining pixel pairs including the first points and the corresponding second points (step S1); determining some foreground pixels and some background pixels in the recto image and the verso image (step S2); performing modeling for the following four types of pixel pairs based on a predetermined feature, on the basis of a result of the determining in the step S2, so as to form four models: both a first point and a second point are foreground pixels, both a first point and a second point are background pixels, a first point is a foreground pixel and a second point is a background pixel, and a first point is a background pixel and a second point is a foreground pixel (step S3); calculating, for a pixel pair that hasn't been modeled, similarities of the pixel pair with respect to the four models respectively, according to the predetermined feature of the pixel pair, so as to determine a type of the pixel pair (step S4); and judging, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel (step S5).

In the step S1, the recto image and the verso image which have been aligned are obtained, where for each first point in the recto image, the second point corresponding thereto in the verso image is known, thereby obtaining the pixel pairs including the first points and the corresponding second points.

As described above, an object to be processed in the invention is a double-sided document with a recto and a verso. Thus, there is input a double-sided image pair including a recto image and a verso image, where the recto image and the verso image are versos of each other.

In the recto image, a text and other contents are foreground pixels, and the other pixels are background pixels. Similarly in the verso image, a text and other contents are foreground pixels, and the other pixels are background pixels. If a foreground pixel of the verso image is bled through to the recto image and does not overlap any foreground pixel of the recto image, then such pixel is bleed-through of the foreground pixel of the verso image on the recto image. If a foreground pixel of the recto image is bled through to the verso image and does not overlap any foreground pixel of the verso image, then such pixel is bleed-through of the foreground pixel of the recto image on the verso image.

It shall be noted that if a foreground pixel of the verso image is bled through to the recto image and overlaps a foreground pixel of the recto image, then such pixel is the foreground pixel of the recto image instead of bleed-through on the recto image. If a foreground pixel of the recto image is bled through to the verso image and overlaps a foreground pixel of the verso image, then such pixel is the foreground pixel of the verso image instead of bleed-through on the verso image.

Thus, a bleed-through pixel on the recto image is decided by two corresponding points on the recto and verso images: when a first point on the recto image is a background pixel, and a second point on the verso image corresponding to the first point is a foreground pixel, this first point on the recto image is a bleed-through pixel of the foreground pixel on the verso image bled through to the recto image.

For the sake of a simplified description, hereinafter a point on the recto image will be referred to as a first point and a point on the verso image will be referred to as a second point.

Apparently, in order to judge whether a pixel is a bleed-through pixel, it is necessary to firstly ascertain a correspondence relationship between a first point on the recto image and a second point on the verso image.

Thus, in the step S1, the recto image and the verso image can be aligned through for example global affine transformation proposed by Dubois and Pathak, etc., so that for each first point in the recto image, a second point corresponding thereto in the verso image is known, thereby obtaining pixel pairs including the first points and the corresponding second points.

In the following, processing will be performed with respect to the pixel pairs including the first points and the corresponding second points.

In the step S2, some foreground pixels and some background pixels in the recto image and the verso image are determined.

As described above, an idea of the invention lies in that firstly some seed pixels are determined and types of the other pixels are determined with reference to features of the seed pixels. Thus, in the step S2, firstly some pixels, types of which can be determined, are extracted.

The step S2 can be performed in a number of implementations.

By way of an example, a type of each first point can be determined according to a relationship in magnitude of a pixel value of the first point with respect to a predetermined first foreground threshold value or first background threshold value. A type of each second point can be determined according to a relationship in magnitude of a pixel value of the second point with respect to a predetermined second foreground threshold value or second background threshold value.

Particularly, if the pixel value of the first point is less than the first foreground threshold value, then the first point is determined as a foreground pixel of the recto image. Moreover, if the pixel value of the first point is larger than the first background threshold value, then the first point is determined as a background pixel of the recto image.

Similarly, if the pixel value of the second point is less than the second foreground threshold value, then the second point is determined as a foreground pixel of the verso image. Moreover, if the pixel value of the second point is larger than the second background threshold value, then the second point is determined as a background pixel of the verso image.

The first and second foreground threshold values can be set relatively small and the first and second background threshold values can be set relatively great to thereby ensure the accuracy of the judging in the step S2.

The first and second foreground threshold values and the first and second background threshold values can be adjusted in magnitude to thereby adjust the number of pixels extracted in the step S2 so as to meet the requirements of modeling.

Those skilled in the art can devise appropriate first and second foreground threshold values and first and second background threshold values in light of general knowledge in the art and as needed in reality.

In another implementation, the step S2 is performed, for example by determining some foreground pixels and some background pixels in the recto image and the verso image according to a relationship in magnitude of a pixel value of each first point with respect to a pixel value of a corresponding second point.

This is because that a bleed-through pixel is characterized in that a bleed-through pixel on one side is lighter, i.e., has a greater pixel value, than a foreground pixel on the other side from which the bleed-through pixel is generated. Thus, a first point and a second point of a pair is compared, and the pixels with a greater difference between the first point and the second point are determined as a bleed-through pixel and a foreground pixel from which the bleed-through pixel is generated.

Particularly, a quotient of the pixel value of the first point with respect to the pixel value of the corresponding second point can be compared with a predetermined third threshold value and fourth threshold value, where the third threshold value is less than 1, and the fourth threshold value is greater than 1. If the quotient is less than the third threshold value, then the first point is a foreground pixel in the recto image, and the second point is a background pixel in the verso image; and if the quotient is greater than the fourth threshold value, then the second point is a foreground pixel in the verso image, and the first point is a background pixel in the recto image.

By way of an example, the third threshold value can be 0.5, and the fourth threshold value can be 2.0, although the invention will not be limited thereto.

It shall be appreciated that the step S2 can be performed in a combination of the above two implementations. For example, some background pixels are extracted in the first implementation, and some foreground pixels are extracted in the second implementation.

Next, the foreground pixels and the background pixels on the recto image and the verso image determined in the step S2 are categorized and modeled.

In the step S3, modeling is performed for the following four types of pixel pairs based on a predetermined feature, on the basis of a result of the determining in the step S2, so as to form four models: both a first point and a second point are foreground pixels, both a first point and a second point are background pixels, a first point is a foreground pixel and a second point is a background pixel, and a first point is a background pixel and a second point is a foreground pixel.

A method of modeling here can be any appropriate known method but will not be limited thereto as long as models to characterize the four sets of pixel pairs can be built based upon features of the four sets of pixel pairs in the method of modeling to thereby distinguish the four sets of pixel pairs from each other and judge to which of the four sets of pixel pairs the other pixel pairs are more similar by comparing their features.

The feature based upon which modeling is performed can be pixel values of a pixel pair or another appropriate feature.

The types of the pixel pairs to be determined can be judged against the four models after the models are built from the four sets of pixel pairs.

In the step S4, for a pixel pair that hasn't been modeled, similarities of the pixel pair with respect to the four models respectively are calculated according to the predetermined feature of the pixel pair, so as to determine a type of the pixel pair.

Particularly, firstly average pixel value pairs and variances of the four models can be calculated respectively; then distances from the pixel pair to the four models can be calculated respectively according to the average pixel value pairs and the variances of the four models and the pixel values of the pixel pair; and the type of the pixel pair can be determined as a type of a pixel pair of a model to which a minimum distance corresponds.

The average pixel value pair refers to a pair including average of pixel values of respective pixels (the first points) and average of pixel values of respective pixels (the second points) in all the pixel pairs (the pairs including the first points and the second points) in a model. Stated otherwise, the pixels of all the first points in a model are averaged, and the pixels of all the second points in the model are averaged, and the results of averaging make an average pixel value pair.

The distance can be embodied as a mahalanobis distance or another appropriate distance, although the invention will not be limited thereto.

Those skilled in the art can appreciate that a model at the shortest distance from the pixel pair is a model to which the pixel pair is the most similar. Thus, the type of the pixel pair can be determined to be consistent with the type of the pixel pairs in the model.

With the above steps S1 to S4, all of the pixel pairs are categorized, and each pixel pair falls into one of the four categories: both a first point and a second point are foreground pixels, both a first point and a second point are background pixels, a first point is a foreground pixel and a second point is a background pixel, and a first point is a background pixel and a second point is a foreground pixel.

Thus, in the step S5, the pixel pairs of the latter two categories can be selected as pixel pairs including bleed-through pixels according to a result of the above judging so that bleed-through pixels are further extracted therefrom.

Particularly, in the step S5, a second point determined as a background pixel which corresponds to a first point determined as a foreground pixel is judged as bleed-through on the verso image, and a first point determined as a background pixel which corresponds to a second point determined as a foreground pixel is judged as bleed-through on the recto image.

With the steps S1 to S5 so far, the locations of the bleed-through pixels in the double-sided image pair including the recto image and the verso image are detected.

It shall be further noted here the recto image and the verso image included in the double-sided image pair can be grayscale images, and the pixel values can be grayscale values.

Alternatively, the recto image and the verso image included in the double-sided image pair can be color images, and the pixel values can be values of respective channels.

Moreover, the first points determined as the foreground pixels can be judged as foreground on the recto image, and the second points determined as the foreground pixels can be judged as foreground on the verso image, according to results of the judging in the steps S1 to S4.

Stated otherwise, the locations of the foreground pixels on the recto image and the verso image included in the double-sided image pair can be further judged as a byproduct of the invention.

In the method of bleed-through detection according to the first embodiment of the invention, in the step S4, for a pixel pair that hasn't been modeled, similarities of the pixel pair with respect to the four models respectively are calculated according to the predetermined feature of the pixel pair, so as to determine a type of the pixel pair.

In the method of bleed-through detection according to a second embodiment of the invention, the number of objects to be processed in the step S4 can be lowered in that all of the pixel pairs that have not been modeled are processed in the first embodiment. In fact, the invention is intended to detect bleed-through pixels, all of which result from foreground pixels being bled-through, so it will suffice if all the foreground pixels are detected and it is judged whether their corresponding points on the verso are background pixels on the verso.

Figure 2:
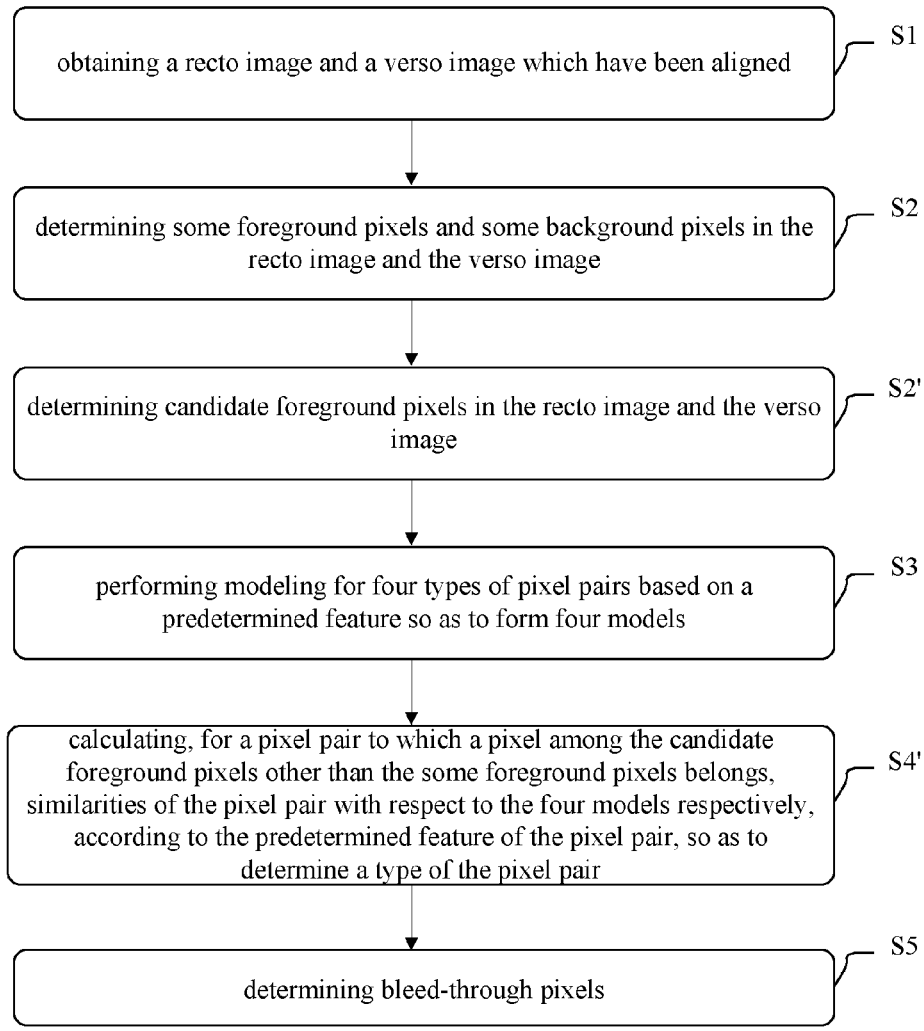
FIG. 2 illustrates a flow chart of a method of bleed-through detection according to a second embodiment of the invention.

FIG. 2 illustrates a flow chart of a method of bleed-through detection according to a second embodiment of the invention.

As illustrated in FIG. 2, the method of bleed-through detection according to the second embodiment of the invention includes the following steps of: obtaining a recto image and a verso image which have been aligned, where for each first point in the recto image, a second point corresponding thereto in the verso image is known, thereby obtaining pixel pairs including the first points and the corresponding second points (step S1); determining some foreground pixels and some background pixels in the recto image and the verso image (step S2); determining candidate foreground pixels in the recto image and the verso image (step S2'); performing modeling for the following four types of pixel pairs based on a predetermined feature, on the basis of a result of the determining in the step S2, so as to form four models: both a first point and a second point are foreground pixels, both a first point and a second point are background pixels, a first point is a foreground pixel and a second point is a background pixel, and a first point is a background pixel and a second point is a foreground pixel (step S3); calculating, for a pixel pair to which a pixel among the candidate foreground pixels other than the some foreground pixels belongs, similarities of the pixel pair with respect to the four models respectively, according to the predetermined feature of the pixel pair, so as to determine a type of the pixel pair (step S4'); and judging, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel (step S5).

The steps S1, S2, S3 and S5 in the second embodiment of the invention are the same as the steps S1, S2, S3 and S5 in the first embodiment of the invention, so they have been assigned with the same reference numbers and a repeated description thereof will be omitted here.

Differences of the second embodiment of the invention from the first embodiment of the invention will be described below.

In the second embodiment of the invention, the step S2' is further performed after the step S2.

In the step S2', the candidate foreground pixels in the recto image and the verso image are determined.

Particularly, the candidate foreground pixels in the recto image and the verso image can be determined by using the above first and second background thresholds.

The first point is determined as a candidate foreground pixel in the recto image if the pixel value of the first point is less than or equal to the predetermined first background threshold value; and the second point is determined as a candidate foreground pixel in the verso image if the pixel value of the second point is less than or equal to the predetermined second background threshold value.

Thus, the candidate foreground pixels judged in the step S2' include all the pixels which are likely to be foreground pixels and also include pixels which have been determined above in the step S2 as the some foreground pixels in the recto image and the vector image.

Thus, it is necessary to further judge pixel pairs to which pixels among the candidate foreground pixels other than the some foreground pixels belong.

In the step S4' (corresponding to the step S4 in the first embodiment), for a pixel pair to which a pixel among the candidate foreground pixels other than the some foreground pixels belongs, similarities of the pixel pair with respect to the four models are calculated respectively according to the predetermined feature of the pixel pair so as to determine a type of the pixel pair.

Thus, with the steps S1 to S4', all the foreground pixels can be extracted, and types of points on the verso corresponding to these foreground pixels can be judged. In the step S5, all the bleed-through pixels can be extracted correspondingly.

As compared with the first embodiment, the amount of calculations can be lowered to some extent without degrading a detection ratio in the method of bleed-through detection according to the second embodiment.

An apparatus for bleed-through detection according to the first embodiment of the invention will be described below with reference to FIG. 3

Figure 3:
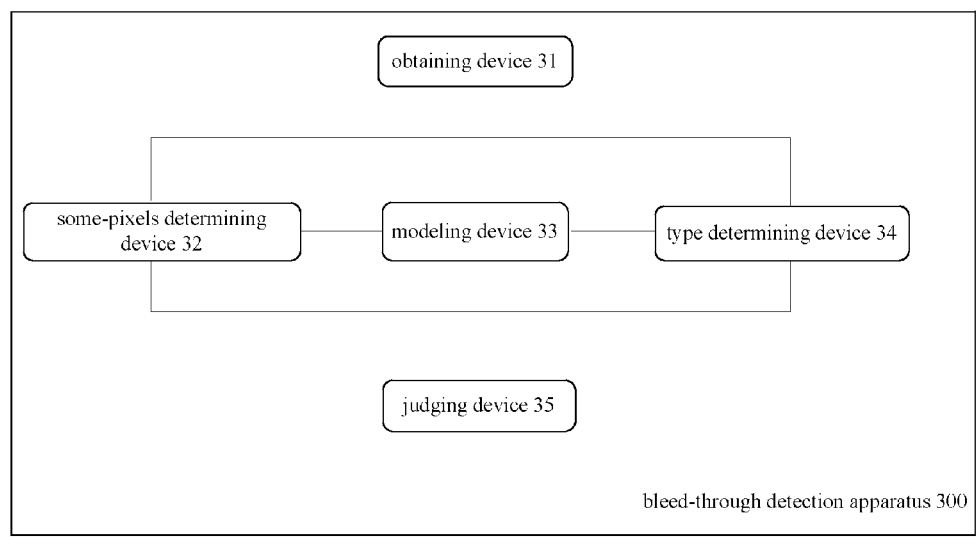
FIG. 3 illustrates a structural block diagram of an apparatus for bleed-through detection according to the first embodiment of the invention.

FIG. 3 illustrates a structural block diagram of an apparatus for bleed-through detection according to the first embodiment of the invention. As illustrated in FIG. 3, the apparatus 300 for bleed-through detection according to the first embodiment of the invention includes: an obtaining device 31 configured to: obtain a recto image and a verso image in a double-sided image pair which have been aligned, wherein for each first point in the recto image, a second point corresponding thereto in the verso image is known, thereby obtaining pixel pairs including the first points and the corresponding second points; a some-pixels determining device 32 configured to: determine some foreground pixels and some background pixels in the recto image and the verso image; a modeling device 33 configured to: perform modeling for the following four types of pixel pairs based on a predetermined feature, on the basis of a result of the determining by the some pixels determining device 32, so as to form four models: both a first point and a second point are foreground pixels, both a first point and a second point are background pixels, a first point is a foreground pixel and a second point is a background pixel, and a first point is a background pixel and a second point is a foreground pixel; a type determining device 34 configured to: calculate, for a pixel pair that hasn't been modeled, similarities of the pixel pair with respect to the four models respectively, according to the predetermined feature of the pixel pair, so as to determine a type of the pixel pair; and a judging device 35 configured to: judge, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel.

In an embodiment, the some-pixels determining device 32 includes a threshold judging unit configured to: determine some foreground pixels in the recto image according to a relationship in magnitude of a pixel value of each first point with respect to a predetermined first foreground threshold value; determine some foreground pixels in the verso image according to a relationship in magnitude of a pixel value of each second point with respect to a predetermined second foreground threshold value; determine some background pixels in the recto image according to a relationship in magnitude of a pixel value of each first point with respect to a predetermined first background threshold value; and determine some background pixels in the verso image according to a relationship in magnitude of a pixel value of each second point with respect to a predetermined second background threshold value.

In an embodiment, the some-pixels determining device 32 includes a recto and verso comparing unit configured to: determine some foreground pixels and some background pixels in the recto image and the verso image according to a relationship in magnitude of a pixel value of each first point with respect to a pixel value of a corresponding second point.

In an embodiment, the recto and verso comparing unit is further configured to: compare a quotient of the pixel value of the first point with respect to the pixel value of the corresponding second point with a predetermined third threshold value and fourth threshold value, the third threshold value being less than 1, the fourth threshold value being greater than 1; and if the quotient is less than the third threshold value, then the first point is a foreground pixel in the recto image, and the second point is a background pixel in the verso image; and if the quotient is greater than the fourth threshold value, then the second point is a foreground pixel in the verso image, and the first point is a background pixel in the recto image.

In an embodiment, the type determining device 34 is further configured to: calculate average pixel value pairs and variances of the four models, respectively; calculate distances from the pixel pair to the four models respectively according to the average pixel value pairs and the variances of the four models and the pixel values of the pixel pair; and determine the type of the pixel pair as a type of a pixel pair of a model to which a minimum distance corresponds.

In an embodiment, the recto image and the verso image included in the double-sided image pair can be grayscale images, and the pixel values can be grayscale values.

In an embodiment, the recto image and the verso image included in the double-sided image pair can be color images, and the pixel values can be values of respective channels.

In an embodiment, the judging device 35 is further configured to: judge, as foreground on the recto image, the first points determined as the foreground pixels, and judge, as foreground on the verso image, the second points determined as the foreground pixels.

An apparatus for bleed-through detection according to the second embodiment of the invention will be described below with reference to FIG. 4.

Figure 4:
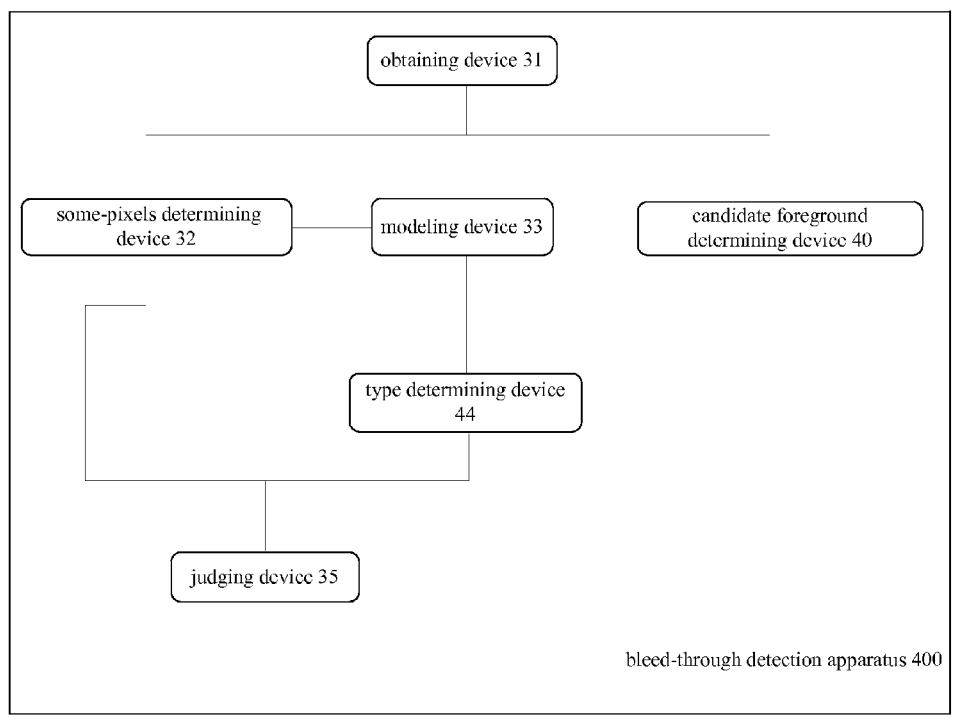
FIG. 4 illustrates a structural block diagram of an apparatus for bleed-through detection according to the second embodiment of the invention.

FIG. 4 illustrates a structural block diagram of an apparatus for bleed-through detection according to the second embodiment of the invention. As illustrated in FIG. 4, the apparatus 400 for bleed-through detection according to the second embodiment of the invention includes: an obtaining device 31 configured to: acquire a recto image and a verso image in a double-sided image pair which have been aligned, wherein for each first point in the recto image, a second point corresponding thereto in the verso image is known, thereby obtaining pixel pairs including the first points and the corresponding second points; a some-pixels determining device 32 configured to: determine some foreground pixels and some background pixels in the recto image and the verso image; a candidate foreground determining device 40 configured to: determine candidate foreground pixels in the recto image and the verso image; a modeling device 33 configured to: perform modeling for the following four types of pixel pairs based on a predetermined feature, on the basis of a result of the determining by the some pixels determining device 32, so as to form four models: both first point and second point are foreground pixels, both first point and second point are background pixels, a first point is a foreground pixel and a second point is a background pixel, and a first point is a background pixel and a second point is a foreground pixel; a type determining device 44 configured to: calculate, for a pixel pair to which a pixel among the candidate foreground pixels other than the some foreground pixels belongs, similarities of the pixel pair with respect to the four models respectively, according to the predetermined feature of the pixel pair, so as to determine a type of the pixel pair; and a judging device 35 configured to: determine, as bleed-through on the verso image, a second point determined as a background pixel which corresponds to a first point determined as a foreground pixel, and judging, as bleed-through on the recto image, a first point determined as a background pixel which corresponds to a second point determined as a foreground pixel.

In an embodiment, the candidate foreground determining device 40 is further configured to: determine the first point as a candidate foreground pixel in the recto image if the pixel value of the first point is less than or equal to the predetermined first background threshold value; and determine the second point as a candidate foreground pixel in the verso image if the pixel value of the second point is less than or equal to the predetermined second background threshold value.

Since the processes in the respective devices and units included in the apparatus for bleed-through detection according to the invention are similar respectively to the processes in the respective steps in the above method of bleed-through detection, a detailed description of these devices and units will be omitted here for the sake of conciseness.

Furthermore, it shall be noted that the respective constituent devices and units in the foregoing apparatus can be configured in software, firmware, hardware or any combination thereof. Particular configuration means or schemes available are well-known to those skilled in the art, and a detailed description thereof will be omitted here. In the case of being embodied in software or firmware, program constituting the software or firmware can be installed from a storage medium or a network to a machine with a dedicated hardware structure (e.g., a general-purpose machine 500 illustrated in FIG. 5) which can perform various functions or the like when various types of program are installed thereon.

Figure 5:
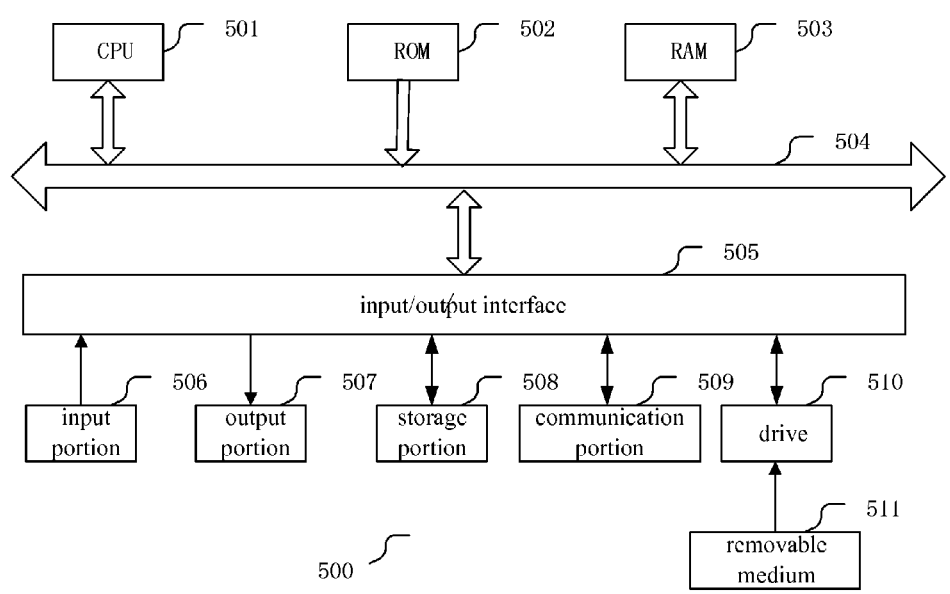
FIG. 5 illustrates a schematic block diagram of a computer in which the methods and the apparatuses according to the embodiments of the invention can be embodied.

FIG. 5 illustrates a schematic block diagram of a computer in which the method and the apparatus according to the embodiments of the invention can be embodied.

In FIG. 5, a Central Processing Unit (CPU) 501 performs various processes according to program stored in a Read Only Memory (ROM) 502 or loaded from a storage portion 508 into a Random Access Memory (RAM) 503 in which data required when the CPU 501 performs the various processes, etc., is also stored as needed. The CPU 501, the ROM 502 and the RAM 503 are connected to each other via a bus 504 to which an input/output interface 505 is also connected.

The following components are connected to the input/output interface 505: an input portion 506 (including a keyboard, a mouse, etc.), an output portion 507 (including a display, e.g., a Cathode Ray Tube (CRT), a Liquid Crystal Display (LCD), etc., a speaker, etc.), a storage portion 508 (including a hard disk, etc.) and a communication portion 509 (including a network interface card, e.g., an LAN card, a modem, etc). The communication portion 509 performs a communication process over a network, e.g., the Internet. A drive 510 is also connected to the input/output interface 505 as needed. A removable medium 511, e.g., a magnetic disk, an optical disk, an optic-magnetic disk, a semiconductor memory, etc., can be installed on the drive 510 as needed so that computer program fetched therefrom can be installed into the storage portion 508 as needed.

In the case that the foregoing series of processes are performed in software, program constituting the software can be installed from a network, e.g., the Internet, etc., or a storage medium, e.g., the removable medium 511, etc.

Those skilled in the art shall appreciate that such a storage medium will not be limited to the removable medium 511 illustrated in FIG. 5 in which the program is stored and which is distributed separately from the apparatus to provide a user with the program. Examples of the removable medium 511 include a magnetic disk (including a Floppy Disk (a registered trademark)), an optical disk (including a Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 502, a hard disk included in the storage portion 508, etc., in which the program is stored and which is distributed together with the apparatus including the same to the user.

Furthermore, the invention further proposes a product program on which machine readable instruction codes are stored. The instruction codes can perform the method above according to the embodiments of the invention upon being read and executed by a machine.

Correspondingly, a storage medium carrying the foregoing program product on which the machine readable instruction codes are stored will also be encompassed in the disclosure of the invention. The storage medium includes but will not be limited to a floppy disk, an optical disk, an optic-magnetic disk, a memory card, a memory stick, etc., In the description above of the particular embodiments of the invention, a feature described and/or illustrated with respect to an implementation can be used identically or similarly in one or more other implementations in combination with or in place of a feature in the other implementation(s).

It shall be emphasized that the term "including/comprising" as used in this context refers to the presence of a feature, an element, a step or a component but does not preclude the presence or addition of one or more other features, elements, steps or components.

Furthermore, the methods according to the invention will not necessarily be performed in a chronological order described in the specification but can alternatively be performed in another chronological order sequentially, concurrently or separately. Therefore the technical scope of the invention will not be limited by the order in which the methods are performed as described in the specification.

Although the invention has been disclosed above in the description of the particular embodiments of the invention, it shall be appreciated that all the foregoing embodiments and examples are illustrative but not limiting. Those skilled in the art can devise various modifications, adaptations or equivalents to the invention without departing from the spirit and scope of the appended claims. These modifications, adaptations or equivalents shall also be regarded as coming into the claimed scope of the invention.

The invention claimed is:

1. A method for bleed-through detection, comprising:
obtaining a recto image and a verso image in a double-sided image pair which have been aligned, where for each first point in the recto image, a second point corresponding thereto in the verso image is known, and obtaining pixel pairs including first points and corresponding second points;
determining foreground pixels and background pixels in the recto image and the verso image;
performing modeling for four types of pixel pairs based on a predetermined feature, on the basis of a result of the determining, to form four models, the four models with the predetermined feature of the four types of pixel pairs comprising: both the first point and the second point are foreground pixels, both the first point and the second point are background pixels, the first point is a foreground pixel and the second point is a background pixel, and the first point is the background pixel and the second point is the foreground pixel;
calculating, for an un-modeled pixel pair that has not been modeled, similarities of the pixel pair with respect to the four models respectively, according to the predetermined feature of the pixel pair to determine a type of the un-modeled pixel pair; and
judging, as verso bleed-through on the verso image, the second point determined as the background pixel which corresponds to the first point determined as the foreground pixel, and judging, as recto bleed-through on the recto image, the first point determined as the background pixel which corresponds to the second point determined as the foreground pixel.

2. The method according to claim 1, wherein the determining foreground pixels and background pixels in the recto image and the verso image comprises:
determining the foreground pixels in the recto image according to a first relationship in magnitude of a pixel value of each first point with respect to a predetermined first foreground threshold value;
determining the foreground pixels in the verso image according to a second relationship in magnitude of the pixel value of each second point with respect to a predetermined second foreground threshold value;
determining some background pixels in the recto image according to a third relationship in magnitude of the pixel value of each first point with respect to a predetermined first background threshold value; and
determining some background pixels in the verso image according to a fourth relationship in magnitude of the pixel value of each second point with respect to a predetermined second background threshold value.

3. The method according to claim 1, wherein the determining foreground pixels and background pixels in the recto image and the verso image comprises:
determining the foreground pixels and the background pixels in the recto image and the verso image according to a relationship in magnitude of a pixel value of each first point with respect to a pixel value of a corresponding second point.

4. The method according to claim 3, wherein the determining the foreground pixels and the background pixels in the recto image and the verso image according to a relationship in magnitude of a pixel value of each first point with respect to a pixel value of a corresponding second point comprises:
comparing a quotient of the pixel value of the first point with respect to the pixel value of the corresponding second point with a predetermined third threshold value and fourth threshold value, the third threshold value being less than 1, and the fourth threshold value being greater than 1; and
if the quotient is less than the third threshold value, then the first point is the foreground pixel in the recto image, and the second point is the background pixel in the verso image; and
if the quotient is greater than the fourth threshold value, then the second point is the foreground pixel in the verso image, and the first point is the background pixel in the recto image.

5. The method according to claim 1, further comprising:
determining candidate foreground pixels in the recto image and the verso image;
wherein the un-modeled pixel pair that has not been modeled includes: a pixel pair to which a pixel among the candidate foreground pixels other than the foreground pixels belongs.

6. The method according to claim 5, wherein the determining candidate foreground pixels in the recto image and the verso image comprises:
determining the first point as the candidate foreground pixel in the recto image, if the pixel value of the first point is less than or equal to the predetermined first background threshold value;
determining the second point as the candidate foreground pixel in the verso image, if the pixel value of the second point is less than or equal to the predetermined second background threshold value.

7. The method according to claim 1, wherein the calculating, for a pixel pair that hasn't been modeled, similarities of the pixel pair with respect to the four models respectively, according to the predetermined feature of the pixel pair, so as to determine a type of the pixel pair, comprises:
calculating average pixel value pairs and variances of the four models, respectively;
calculating distances from the pixel pair to the four models, respectively, according to the average pixel value pairs and the variances of the four models and the pixel values of the pixel pair; and
determining a type of the pixel pair as the type of the pixel pair of the model to which a minimum distance corresponds.

8. The method according to claim 1, wherein the recto image and the verso image included in the double-sided image pair are grayscale images, and the pixel values are grayscale values.

9. The method according to claim 1, wherein the recto image and the verso image included in the double-sided image pair are color images, and the pixel values are values of respective channels.

10. The method according to claim 1, further comprising:
judging, as foreground on the recto image, the first points determined as the foreground pixels, and judging, as foreground on the verso image, the second points determined as the foreground pixels.

11. An apparatus for bleed-through detection, comprising:
an obtaining device configured to: obtain a recto image and a verso image in a double-sided image pair which have been aligned, where for each first point in the recto image, a second point corresponding thereto in the verso image is known, and obtain pixel pairs including first points and corresponding second points;

a pixels determining device configured to: determine foreground pixels and background pixels in the recto image and the verso image;

a modeling device configured to: perform modeling for four types of pixel pairs based on a predetermined feature, on the basis of a result of the determining by the pixels determining device, to form four models, four models with the predetermined feature of the four types of pixel pairs comprising: both the first point and the second point are foreground pixels, both the first point and the second point are background pixels, the first point is a foreground pixel and the second point is a background pixel, and the first point is the background pixel and the second point is the foreground pixel;

a type determining device configured to: calculate, for an un-modeled pixel pair that has not been modeled, similarities of the pixel pair with respect to the four models respectively, according to the predetermined feature of the pixel pair, to determine a type of the un-modeled pixel pair; and a judging device configured to: judge, as bleed-through on the verso image, the second point determined as the background pixel which corresponds to the first point determined as the foreground pixel, and judging, as bleed-through on the recto image, the first point determined as the background pixel which corresponds to the second point determined as the foreground pixel.

12. The apparatus for bleed-through detection according to claim 11, wherein the pixels determining device comprises a threshold judging unit configured to:

determine the foreground pixels in the recto image according to a relationship in magnitude of a pixel value of each first point with respect to a predetermined first foreground threshold value;

determine some foreground pixels in the verso image according to the relationship in magnitude of the pixel value of each second point with respect to a predetermined second foreground threshold value;

determine some background pixels in the recto image according to the relationship in magnitude of the pixel value of each first point with respect to a predetermined first background threshold value; and determine some background pixels in the verso image according to the relationship in magnitude of the pixel value of each second point with respect to a predetermined second background threshold value.

13. The apparatus for bleed-through detection according to claim 11, wherein the pixels determining device includes a recto and verso comparing unit configured to: determine the foreground pixels and the background pixels in the recto image and the verso image according to a relationship in magnitude of a pixel value of each first point with respect to the pixel value of a corresponding second point.

14. The apparatus for bleed-through detection according to claim 13, wherein the recto and verso comparing unit is further configured to:

compare a quotient of the pixel value of the first point with respect to the pixel value of the corresponding second point with a predetermined third threshold value and fourth threshold value, the third threshold value being less than 1, the fourth threshold value being greater than 1; and if the quotient is less than the third threshold value, then the first point is the foreground pixel in the recto image, and the second point is the background pixel in the verso image; and if the quotient is greater than the fourth threshold value, then the second point is the foreground pixel in the verso image, and the first point is the background pixel in the recto image.

15. The apparatus for bleed-through detection according to claim 11, further comprising a candidate foreground determining device configured to: determine candidate foreground pixels in the recto image and the verso image;

wherein the un-modeled pixel pair that has not been modeled includes: the pixel pair to which a pixel among the candidate foreground pixels other than the some foreground pixels belongs.

16. The apparatus for bleed-through detection according to claim 15, wherein the type determining device is further configured to:

determine the first point as a candidate foreground pixel in the recto image, if the pixel value of the first point is less than or equal to the predetermined first background threshold value;

determine the second point as the candidate foreground pixel in the verso image, if the pixel value of the second point is less than or equal to the predetermined second background threshold value.

17. The apparatus for bleed-through detection according to claim 11, wherein the type determining device is further configured to:

calculate average pixel value pairs and variances of the four models, respectively;

calculate distances from the pixel pair to the four models respectively according to the average pixel value pairs and the variances of the four models and the pixel values of the pixel pair; and determine a type of the pixel pair as the type of the pixel pair of a model to which a minimum distance corresponds.

18. The apparatus for bleed-through detection according to claim 11, wherein the recto image and the verso image included in the double-sided image pair are grayscale images, and the pixel values are grayscale values.

19. The apparatus for bleed-through detection according to claim 11, wherein the recto image and the verso image included in the double-sided image pair are color images, and the pixel values are values of respective channels.

20. The apparatus for bleed-through detection according to claim 11, wherein the judging device is further configured to:

judge, as foreground on the recto image, the first points determined as the foreground pixels, and judge, as foreground on the verso image, the second points determined as the foreground pixels.

* * * * *